Patented Apr. 16, 1940

2,197,477

UNITED STATES PATENT OFFICE 2,197,477

METHOD OF INHIBITING GUM FORMATION IN LIQUID HYDROCARBONS

Willard E. Lyons and Walter S. Guthmann, Chicago, Ill., assignors to Hendricks Research Corporation, Chicago, Ill., a corporation of Illinois No Drawing. Application December 6, 1937, Serial No. 178,348

6 Claims. (Cl. 44—9)

This invention relates to a method of inhibiting gum formation in liquid hydrocarbons having a tendency toward the formation of gum therein during storage. The invention more particularly relates to a method of inhibiting gum formation in liquid hydrocarbon motor fuels, such as gasolines obtained by any of the usual processes of distillation, cracking, or polymerization, aromatic hydrocarbons such as benzol, or blended fuels containing any of these.

In the copending application filed by one of us, Walter S. Guthmann, U. S. Serial No. 141,256, filed May 7, 1937, there is described the addition of organic acids or acid reacting organic compounds, including beta diketones, to a motor fuel containing dissolved metal organic compounds, the purpose being to prevent the hydration or hydrolysis, or formation of a basic salt of metal, of the metal organic compounds, when or if water is present or becomes associated with the motor fuel. The addition of the beta diketone, or other organic acid or acid reacting organic compound, serves to stabilize the solution of the metal beta diketone compound incorporated in the motor fuel to increase its combustion efficiency.

The present invention concerns itself with a method of storing such liquid hydrocarbons, particularly motor fuels, as have a tendency toward gum formation, with a view to the prevention of the formation of gum in the liquid hydrocarbons during storage.

The exact mechanism of gum formation in liquid hydrocarbon motor fuels is not understood, but authorities seem to agree that the initial step in gum formation consists in the addition of oxygen, taken from the air, at the double bonds of the unsaturated organic compounds present in the fuel, forming the so-called "peroxides." The "peroxides" in some way then undergo further reaction or polymerization to form a gum-like substance. The initial period during which no, or practically no absorption of oxygen by the gasoline takes place, is called the induction period. At the end of this period oxygen is absorbed at a definite rate for a given gasoline, the rate being independent of the length of the induction period. The process that takes place after the induction period is spoken of as autoxidation, the belief being that the products formed in the gasoline due to oxygen absorption themselves catalyze further oxidation reaction.

Previous workers in this field have found that the so-called induction period may be greatly prolonged by the use of gum inhibitors or antioxidants, such as benzyl para amino-phenol. The practice has been, therefore, to add sufficient inhibitor, such as benzyl para amino-phenol, to these gasolines at the start to prolong its induction period beyond the normal period of storage.

We have now found that diketones in their free state, that is, unassociated with metals, have an inhibiting effect toward the formation of gum in liquid hydrocarbon motor fuels that have a tendency toward gum formation. We have found, for instance, that concentrations of as little as 0.001% of free diketones by volume of the fuel are sufficient to inhibit gum formation. The concentration will be influenced to some degree by the expected duration of the storage period and the character of the fuel constituents.

It is therefore an important object of this invention to provide a method of inhibiting the formation of gum in liquid hydrocarbons, motor fuels and the like, that have a tendency toward gum formation, by the addition thereto of very minor proportions of a diketone, or mixture of diketones, in their free state or as salts or other derivatives, uncombined with any metal.

Other and further important objects of this invention will become apparent from the following description and appended claims.

Examples of diketones, or non-metallic diketone bodies, that can be satisfactorily used as inhibitors, are biacetyl, acetylacetone, propionylacetone, butyrylacetone, valerylacetone, acetonylacetone, and their homologues. Fuel soluble, non-metallic derivatives of beta diketones, such as ammonium propionylacetonate, mono or dioxime of acetylacetonate, benzyl para aminophenol acetylacetonate, and the like may also be used. The non-metallic derivatives of the beta diketones may be produced separately and added to the motor fuel, or may be formed in the fuel by adding thereto, for example, benzyl para amino-phenol and propionylacetone. The term "non-metallic diketone body" as used herein is intended to include not only the diketones in their free state but also non-metallic derivatives thereof such as ammonium propionyl-acetonate, benzyl para aminophenol acetylacetonate, and the like.

The non-metallic diketone bodies may be added to the liquid hydrocarbon motor fuel in concentrations of about 0.001% to 0.05% of the fuel by volume, larger concentrations being, of course, permissible, but usually unnecessary. The non-metallic diketone bodies are, in general, readily soluble in the usual liquid hydrocarbon motor fuels to give the desired concentrations.

We are aware that numerous details of the process may be varied through a wide range without departing from the principles of this invention, and we, therefore, do not purpose limiting the patent granted hereon otherwise than necessitated by the prior art.

We claim as our invention:

1. The method of inhibiting gum formation in a liquid hydrocarbon of the gasoline type having a tendency toward gum formation, which comprises incorporating in said liquid hydrocarbon a minor proportion of a beta diketone, sufficient in amount to be effective in inhibiting gum formation but insufficient to materially lower the spontaneous ignition temperature of said hydrocarbon.

2. The method of inhibiting gum formation in a liquid hydrocarbon having a tendency toward gum formation, which comprises incorporating in said liquid hydrocarbon between 0.001% and 0.05% by volume of acetylacetone.

3. The method of inhibiting gum formation in a liquid hydrocarbon having a tendency toward gum formation, which comprises incorporating in said liquid hydrocarbon between 0.001% and 0.05% by volume of propionylacetone.

4. The method of inhibiting gum formation in a gasoline having a tendency toward gum formation, which comprises incorporating in said gasoline between 0.001% and 0.05% by volume of a free beta diketone.

5. The method of inhibiting gum formation in a gasoline having a tendency toward gum formation, which comprises incorporating in said gasoline between 0.001% and 0.05% by volume of acetylacetone.

6. The method of inhibiting gum formation in a gasoline having a tendency toward gum formation, which comprises incorporating in said gasoline between 0.001% and 0.05% by volume of propionylacetone.

WILLARD E. LYONS.
WALTER S. GUTHMANN.